US006667602B2

(12) United States Patent
Cook

(10) Patent No.: US 6,667,602 B2
(45) Date of Patent: Dec. 23, 2003

(54) LOW FREQUENCY SWITCHING VOLTAGE PRE-REGULATOR

(75) Inventor: Roger J. Cook, Livonia, MI (US)

(73) Assignee: Visteon Global Technologies, Inc., Dearborn, MI (US)

(*) Notice: Subject to any disclaimer, the term of this patent is extended or adjusted under 35 U.S.C. 154(b) by 0 days.

(21) Appl. No.: 10/094,077

(22) Filed: Mar. 8, 2002

(65) Prior Publication Data

US 2003/0169024 A1 Sep. 11, 2003

(51) Int. Cl.[7] .............................. G05F 1/40; G05F 1/569
(52) U.S. Cl. .......................................... 323/268; 323/276
(58) Field of Search ................................. 323/268, 272, 323/282, 283, 284, 266, 285; 363/89, 95, 81, 85, 65

(56) References Cited

U.S. PATENT DOCUMENTS

| 4,618,812 A | * | 10/1986 | Kawakami ................... 323/224 |
| 4,868,662 A | | 9/1989 | Hartman et al. |
| 4,881,023 A | | 11/1989 | Perusse et al. |
| 4,893,228 A | * | 1/1990 | Orrick et al. ................ 363/89 |
| 5,216,351 A | | 6/1993 | Shimoda |
| 5,592,072 A | | 1/1997 | Brown |
| 5,627,460 A | | 5/1997 | Bazinet et al. |
| 5,864,225 A | | 1/1999 | Bryson |
| 6,130,525 A | | 10/2000 | Jung et al. |
| 6,229,289 B1 | | 5/2001 | Piovaccari et al. |
| 6,476,589 B2 | * | 11/2002 | Umminger et al. .......... 323/282 |

FOREIGN PATENT DOCUMENTS

JP                10337019 A              10/1999

OTHER PUBLICATIONS

Combined Search and Examination Report from Great Britain, GB 0302819.8, dated Jun. 19, 2003, 3 pages.

* cited by examiner

Primary Examiner—Rajnikant B. Patel
(74) Attorney, Agent, or Firm—Brinks Hofer Gilson & Lione

(57) ABSTRACT

The low-frequency, low power switching voltage switching pre-regulator is operable to propagate The pre-regulator is comprised of a chopping circuit, a pre-driver switching circuit and a feed back circuit. The output of the chopping circuit defines the output of the voltage pre-regulator and an input voltage is received at the input of the chopping circuit. The feedback circuit senses the magnitude of the voltage at the chopping circuit and derives a feedback signal in response thereto. The PWM interface circuit receives the feedback signals and a PWM signal of the type generally derived from a microprocessor. The PWM interface circuit switches the chopping circuit in response to the feedback and the PWM signals.

20 Claims, 3 Drawing Sheets

PRIOR ART

LOW FREQUENCY SWITCHING VOLTAGE PRE-REGULATOR

FIELD OF THE INVENTION

This invention generally relates to voltage regulation. More particularly, this invention relates to a low-frequency, low-power switching voltage pre-regulator having automatic sleep-mode switchover.

DESCRIPTION OF THE RELATED ART

Linear voltage regulators generate a substantially constant output voltage $V_{OUT}$ from a relatively variable input voltage. Linear voltage regulators also provide low quiescent sleep current. Linear voltage regulators are operative to provide the regulated output voltage $V_{OUT}$ over a range of input voltages. Such linear regulators are used to provide dc voltage signals for circuits designed to receive substantially constant voltage levels with low voltage ripple. Linear voltage regulators may also be designed to provide the constant output voltage $V_{OUT}$ independent of a relatively large input voltage $V_{IN}$. Accordingly, linear voltage regulators that are designed to operate with higher $V_{OUT}/V_{IN}$ ratios are desirable. For example, linear regulators may provide a substantially constant 7.6 Volts output voltage independent of input voltages for input voltage up to a maximum of 42 Volts. Such linear regulators are desirable in devices or electronic circuits having a Voltage source with a variable output that may be configured to provide Voltage signals to other circuitry requiring stable Voltage signals. By way of example, such linear voltage regulators having substantially constant output voltage $V_{OUT}$ and having a large $V_{OUT}/V_{IN}$ ration are desirable in hybrid analog and digital electronic circuits. Such prior art linear regulators, however, typically generate a relatively large amount of heat that is dissipated, for example, through a relatively large metal heat sink mechanically coupled with the linear regulator.

FIG. 1 is a diagram showing a prior art a cascade design voltage regulator 100 having a switching pre-regulator circuit 102 and a linear regulator circuit 104. The switching pre-regulator circuit 102 receives the input voltage $V_{IN}$ at an input terminal 108 and produces a chopped voltage $V_{CH}$ at a junction terminal 110. The chopped voltage $V_{CH}$ is generated by the switching pre-regulator circuit 102 typically through electrical elements such as chokes, and diodes. The magnitude of the chopped voltage $V_{CH}$ is less than the input voltage $V_{IN}$ and substantially within a desired input voltage range for the linear regulator circuit 104. The magnitude of chopped voltage $V_{CH}$ will generally cycle up and down between an upper limit and a lower limit for the switching pre-regulator circuit 102. The cycle is commonly referred to as a limit cycle.

The linear regulator circuit 104 receives the chopped voltage $V_{CH}$ at the junction terminal 110 and generates a smooth, regulated output voltage $V_{OUT}$ of a substantially constant level at its output terminal 112. Because the chopped voltage $V_{CH}$ received by the linear regulator circuit 104 is substantially lower than the input voltage $V_{IN}$, the linear regulator circuit 104 operates more efficiently dissipating less power and thereby the cascade design voltage regulator 100, has improved voltage conversion efficiency. A cascade design voltage regulator 100 may include a feedback voltage $V_{FB}$, which is derived from the output voltage $V_{OUT}$ of the linear regulator circuit 104 and received by the switching pre-regulator circuit 102. The switching pre-regulator circuit 102 thereby generates the chopped voltage $V_{CH}$ in response to the feedback voltage $V_{FB}$.

It is desirable to conserve the amount of power consumed while controlling the operation of the linear voltage regulator circuit 104. Prior art voltage regulators do not provide for control to switch the pre-regulator circuit 102 to a sleep mode when the output voltage $V_{OUT}$ is not needed, or power from the voltage regulator is not needed. For example, the voltage regulator can be placed in a standby condition when a circuit to which the voltage regulator 100 provides the output Voltage $V_{OUT}$ needs minimal power, and thereby minimize the power dissipated by the regulator. It is further desirable that such regulators would be controlled by signals commonly generated by microprocessors. Accordingly, there is a need in the art voltage regulators having a low frequency, low-power switching voltage pre-regulator circuit.

BRIEF SUMMARY OF THE INVENTION

Embodiments of this invention provide low-frequency, low power switching voltage pre-regulator circuit for providing a chopped voltage to a linear voltage regulator circuit.

In view of the above noted limitations of the prior art, an object of the present invention is to provide an improved voltage regulator that minimizes the amount of power dissipated by the voltage regulator circuit and is capable of being controlled with a pulse width modulated ("PWM") signal of the type generally provided by a microprocessors in order to obtain. More particularly, an input is provided to control a voltage pre-regulator circuit to provide a sleep mode for the voltage regulator when a circuit with which the voltage regulator may be coupled does requires minimal power.

In one aspect, a low-frequency switching voltage pre-regulator circuit, includes an input node, a pulse width modulated ("PWM") signal input node; and a chopped voltage node. The input node may be configured to receive an input voltage signal $V_{IN}$ having a magnitude in the range from and including about 20 Volts to and including about 58 Volts. The PWM input node may be configured to receive a PWM signal having a frequency substantially in the range from about 5 kiloHertz to and about 15 kiloHertz and a duty cycle in the range from about 25% to 50%. The pre-regulator circuit may be configured to generate a chopped voltage $V_{CH}$ at the chopped voltage node in response to the PWM signal and the input voltage $V_{IN}$ and independent of the magnitude of the input voltage $V_{IN}$. The chopped voltage $V_{CH}$ may have a magnitude in the range from about 6 Volts to about 10 Volts.

The low-frequency switching voltage pre-regulator may further include a chopping circuit coupled with the input node, a bucking circuit, a feedback and sense circuit, and a pre-driver switching circuit. The chopping circuit may be configured to receive the input voltage $V_{IN}$ and generates a bucking signal in response to a switching signal. The bucking circuit is coupled with the chopping circuit generates the chopped voltage $V_{CH}$ at a chopped voltage node in response to the bucking signal. The feedback and sense circuit is coupled with the chopped voltage node and provides a feedback signal in response to the magnitude of the chopped voltage $V_{CH}$. The pre-driver switching circuit is coupled with the PWM input node and with the feedback and sense circuit selectively generates the switching signal in response to the feedback signal and PWM signal.

In a method for controlling a voltage output in response to a input voltage includes selectively generating a chopped voltage signal in response to a pulse width modulated ("PWM") signal received from microprocessor and an input voltage having a magnitude substantially within a range from and including about 20 Volts to and including about 58 Volts, the chopped voltage having a magnitude independent of the input voltage and being substantially within the range from and including about 6 Volts to and including about 10 Volts, the magnitude of the chopped voltage being independent of the magnitude of the input voltage.

The method may further include generating the PWM signal from a microprocessor circuit, wherein the PWM signal has a frequency between about 5 kiloHertz and 15 kiloHertz and about a 33 percent duty cycle.

Other systems, methods, features, and advantages of the invention will be or will become apparent to one skilled in the art upon examination of the following figures and detailed description. All such additional systems, methods, features, and advantages are intended to be included within this description, within the scope of the invention, and protected by the accompanying claims.

BRIEF DESCRIPTION OF SEVERAL VIEWS OF THE DRAWINGS

The invention may be better understood with reference to the following figures and detailed description. The components in the figures are not necessarily to scale, emphasis being placed upon illustrating the principles of the invention. Moreover, like reference numerals in the figures designate corresponding parts throughout the different views.

DETAILED DESCRIPTION OF THE PREFERRED EMBODIMENTS

Herein, the phrase "coupled with" is defined to mean directly connected to or indirectly connected with through one or more intermediate components.

Figure 1:
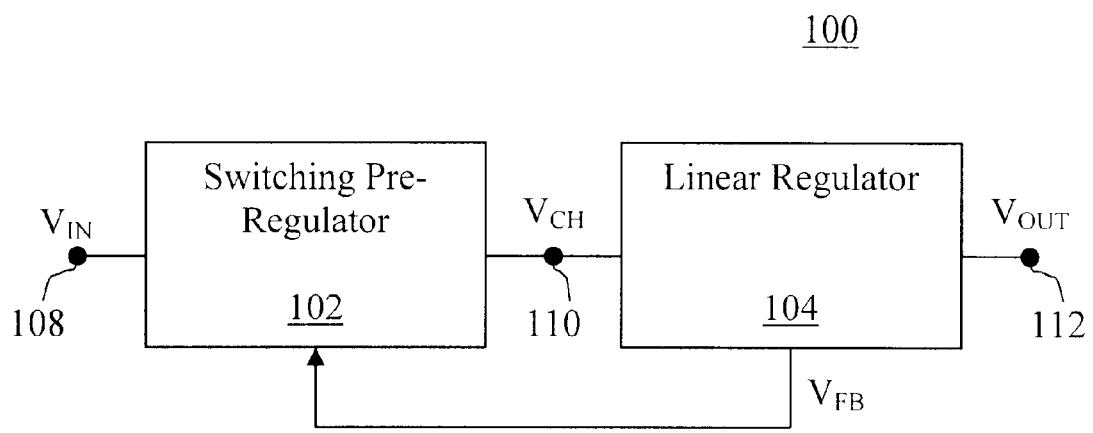
FIG. 1 represents a block diagram for a prior art cascade design voltage regulator.

FIG. 1 is a block diagram for a prior art a cascade design voltage regulator 100 having a switching pre-regulator circuit 102 and a linear regulator circuit 104. The cascade design voltage regulator 100 generates a substantially constant output voltage $V_{OUT}$ from a relatively large range of input voltage $V_{IN}$. The switching pre-regulator circuit 102 receives an input voltage $V_{IN}$ at an input voltage node 108 and produces a chopped voltage $V_{CH}$ at a junction terminal 110. The chopped voltage $V_{CH}$ has a Voltage magnitude that is generally less than the input voltage $V_{IN}$ and substantially on the order of the desired voltage input range for the linear regulator circuit 104. The linear regulator circuit receives the chopped voltage $V_{CH}$ and generates the substantially constant output voltage $V_{OUT}$.

Figure 2:
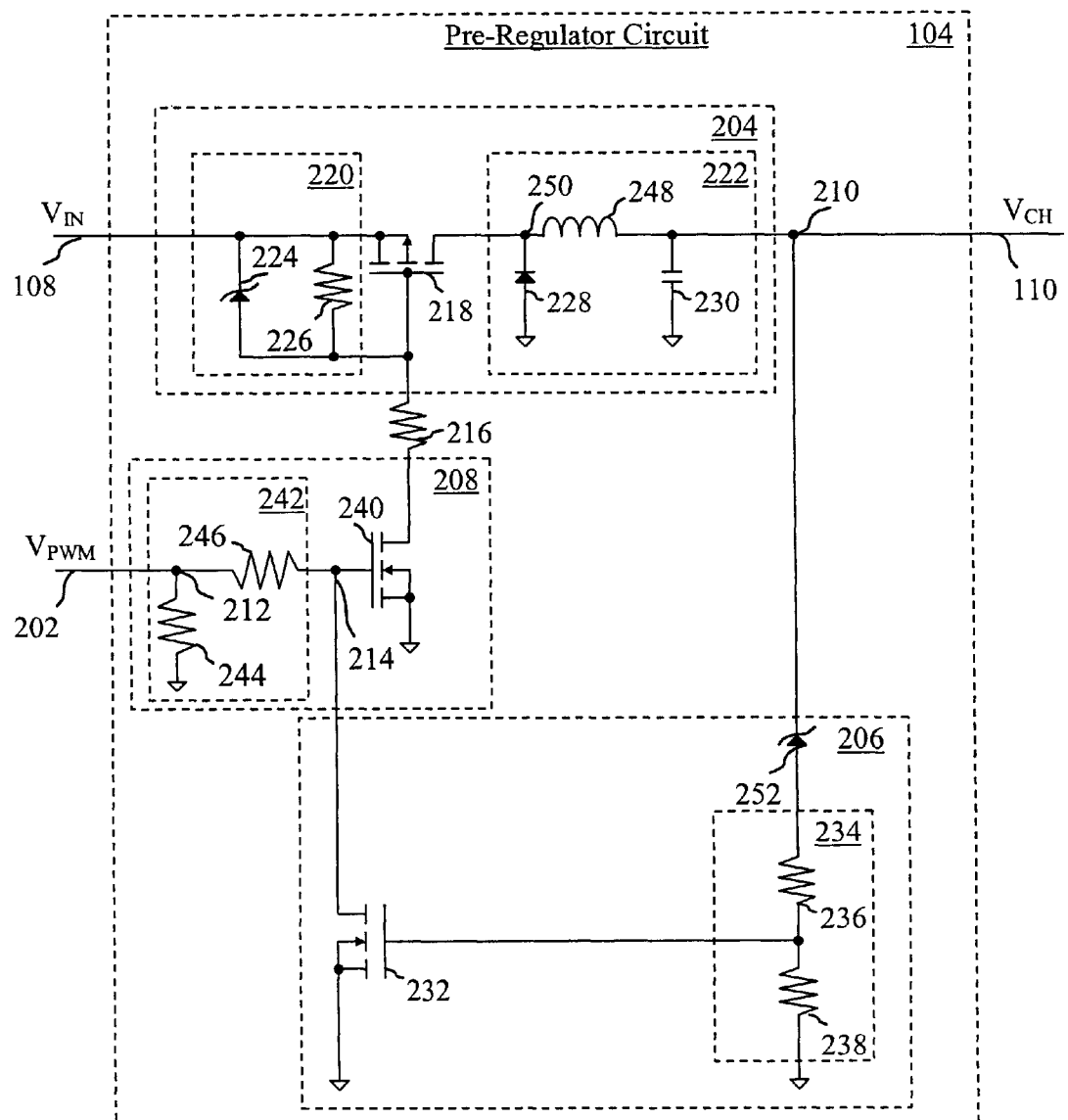
FIG. 2 represents a schematic diagram for an embodiment for a voltage pre-regulator.

Referring now to FIG. 2 there is schematically shown an embodiment of a low-frequency, low-power switching voltage pre-regulator circuit 104 having automatic sleep-mode switchover. The pre-regulator circuit includes the input voltage node 108, the chopped voltage node 110, and a pulse width modulated ("PWM") signal input node 202. The pre-regulator circuit is configured to generate the chopped voltage $V_{CH}$ independent of the magnitude of the input voltage $V_{IN}$ and in response to a PWM signal received at the PWM signal input node 202. The pre-regulator circuit 104 generates the chopped voltage $V_{CH}$ at the chopped voltage node 110 when a PWM signal is received at the PWM input node 202 and switches to a sleep mode when the PWM signal is not received at the PWM input node 202. In the sleep mode, the magnitude of the voltage at the chopped voltage node 110 is substantially equal to $V_{IN}$, and current flow through the pre-regulator circuit 104 is minimal. Therefore, the voltage pre-regulator circuit 104 may be controlled by the PWM signal received at the PWM input node 202.

In one aspect, the input voltage $V_{IN}$ may have a magnitude of between 20 Volts and 58 Volts and the PWM signal is a control signal of the type generated by a microprocessor circuit and having frequency between 5 kiloHertz and 15 kiloHertz and a duty cycle between 25% and 50%, and preferably about 33%. It is desirable for the pre-regulator to generate a substantially constant chopped voltage $V_{CH}$ having a magnitude in the range from 6 Volts to 10 Volts, and preferably about 7.6 Volts. The voltage pre-regulator 104 is configured to generate a substantially constant dc chopped voltage $V_{CH}$, although those skilled in the art will recognize that the dc chopped voltage $V_{CH}$ may have an insubstantial amount of limit cycle ripple.

The pre-regulator circuit 104 further includes a chopping circuit 204, a feedback and sense circuit 206, and a pre-driver switching circuit 208. The chopping circuit 204 is coupled with the input voltage node 108 and has an output node 210 that defines the chopped voltage output node 110. The feedback and sense circuit 206 has an input coupled with the chopping circuit output node 210. The pre-driver circuit 208 is coupled with the PWM input node 202 at a PWM interface node 212 and a feedback node 214 coupled with the feedback and sense circuit 206. The pre-driver circuit 208 is configured to propagate the PWM signal to the chopping circuit 204 in response to a feedback signal received from the feedback and sense circuit at the feedback node 214. In one embodiment, the PWM signal is propagated to the chopping circuit 204 via a current limiting resistor 216 having a resistance of 100 kiloOhms.

The chopping circuit 204 is configured to generate the chopped voltage $V_{CH}$ at the output 210 in response to a switching signal received from the pre-driver circuit 208 via a current limiting resistor. The chopping circuit 204 includes a three-terminal power-switching semiconductor transistor 218 and a bucking circuit 222. The switching transistor 218 includes a source, a drain, and a gate. In an embodiment, the switching transistor is a P-channel enhancement type MTP5P06V MOSFET transistor having a drain-to-source withstand voltage of at least 60 Volts. The source of the switching transistor 218 is coupled with the voltage input node 108 and the gate of the switching transistor 218 is coupled with the pre-driver circuit 208. In an embodiment, the gate of the switching transistor 218 is coupled with the pre-driver circuit 208 via the current limiting resistor 216. The drain of the switching transistor 218 is coupled with the bucking circuit 222. The switching transistor 218 is configured to propagate the input voltage $V_{IN}$ to the bucking circuit in response to a switching signal received from the pre-driver circuit 208.

The chopping circuit 204 may additionally include an input bias network 220. The input bias network 220 includes an input diode 224 and an input resistor 226 both coupled between the gate and the source of the switching transistor 218. The input diode 224 regulates the voltage between the source and the gate of the switching transistor 218 when the switching transistor is switched on and the input resistor balances the voltage between the source and the gate of the switching transistor 218 when the switching transistor is switched off. In an embodiment, the input resistor has a resistance of 100 kiloOhms and the input diode 224 has a breakdown voltage of approximately 10 Volts assuring that the voltage between the source and the gate does not exceed 10 Volts.

The bucking circuit 222 includes bucking coil 248, a charge well 230, and a return diode 228. The bucking coil 248 has a first terminal coupled with the drain of the switching transistor 218 at a bucking node 250 and a second terminal defining the chopping circuit output 210. The charge well 230 is coupled between the second terminal of the bucking coil 248 at chopping circuit output 210 and a ground reference (0 Volts). The return diode 228 is coupled between the bucking node 250 and the ground reference.

When the input voltage $V_{IN}$ is propagated to the bucking circuit 222 by the switching transistor 218, a magnetic field is created in the bucking coil 248 to charge. When the input voltage $V_{IN}$ is removed by the switching transistor 218, the field in the bucking coil collapses and causes electric current to conduct to the chopping circuit output node 210. The current at the chopping circuit output node 210 flows to the charge well 230 and to the output 210. Electric charge accumulates in the charge well 230 in response to the current therein and a voltage is generated at chopping circuit output node 210. In the absence of the input voltage $V_{IN}$, the charge on the charge well 230 causes a current that can flow to the output node 210. The return diode 228 provides a return path from the ground reference to the bucking coil 248 in the absence of the input voltage $V_{IN}$ at the bucking node 250. In an embodiment, the charge well 230 is a capacitor having a capacitance of 300 microFarads.

The feedback and sense circuit 206 includes a feedback transistor 232, a bias network 234, and a sense diode 252. The feedback and sense circuit 206 detects the voltage at the chopping circuit output node 210 and generates a feedback signal in response thereto. The feedback transistor 232 includes a source, a gate and a drain. In an embodiment, the feedback transistor is an N-channel enhancement type 2N7000 MOSFET or similar transistor. The drain of the feedback transistor 232 defines the output of the feedback and sense circuit 206 and is coupled with the feedback node 214 and the drain of the feedback transistor 232 is coupled with the ground reference.

The sense diode 252 is coupled between the chopping circuit output node 210 and the bias network 234. The bias network 234 is coupled between the sense diode 252 and a ground reference and has an output coupled with the gate of the feedback transistor 232. The sense diode 252 is configured to conduct electric current when the magnitude of the voltage at the chopping circuit output node 210 equals or exceeds a pre-selected value. The bias network 234 is configured to switch the feedback transistor 232 in response to current through the sense diode 252 and the feedback transistor 232 thereby generates a feedback signal at the feedback node 214. In an embodiment, the sense diode 252 has a breakdown voltage of 4.7 Volts and bias network includes a first bias resistor 236 and second a second bias resistor 238 each having a resistance value of 30 kiloOhms.

The pre-driver circuit 208 includes a pre-driver transistor 240 and a PWM interface network 242. The pre-driver transistor 240 includes a source, a drain, and a gate. In an embodiment, the feedback transistor is an N-channel enhancement type 2N7000 MOSFET or similar transistor. The gate of the pre-driver transistor 240 is coupled with the feedback node 214, the source of the pre-driver transistor 240 is coupled with the ground reference and the drain of the pre-driver transistor 240 is coupled with the gate of the switching transistor 218. The pre-driver circuit 208 is configured to propagate the PWM signal to the switching transistor 218 in response to the feedback signal at the feedback node 214. The PWM interface circuit 242 receives the PWM signal at the PWM interface node 212. When the PWM signal is propagated by the pre-driver circuit 208 to the switching transistor 218, the switching transistor 218 propagates the input voltage $V_{IN}$ to the bucking coil 248 and allows electric current to flow from the input voltage node 108 to charge the charge well 230 and to the chopped voltage output node 210. In the absence of the PWM signal, the pre-regulator circuit 104 will switch to a sleep mode, whereby the input voltage $V_{IN}$ is propagated to the chopping circuit output node 210 and the switching transistor 218 will conduct minimal current. Because the current through the switching transistor 218 is minimal, power dissipated by the pre-regulator circuit 104 is reduced. In an embodiment, the pre-regulator circuit 104 may cycle between sleep mode and an on mode.

The PWM interface circuit 242 includes a first bias resistor 244 and a second bias resistor 246. The first bias resistor 244 is coupled between the PWM interface node 212 and the ground reference. The second bias resistor 246 is coupled between the PWM interface node and the feedback node 214. In an embodiment, the first bias resistor 244 has a resistance of 200 kiloOhms and the second bias resistor 246 has a resistance of 20 kiloOhms.

Figure 3:
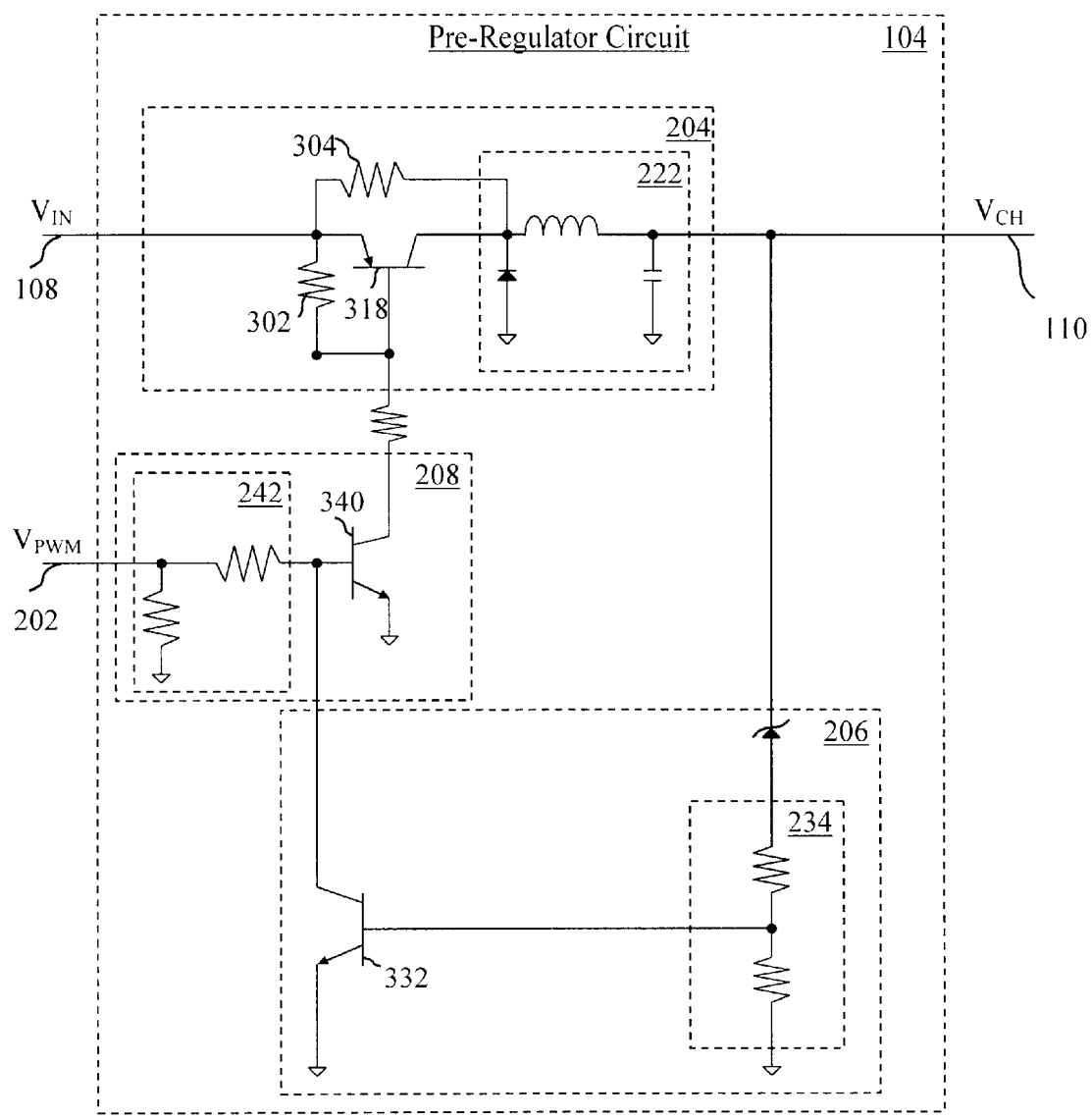
FIG. 3 represents a schematic diagram for an alternate embodiment for a voltage pre-regulator.

Referring now to FIG. 3, an alternate embodiment of a low-frequency, low-power switching voltage pre-regulator circuit 104 having automatic sleep-mode switchover and realized with bipolar active transistors is shown. The pre-regulator circuit includes the input voltage node 108, the chopped voltage node 110, and a pulse width modulated ("PWM") signal input node 202. The pre-regulator circuit 104 is configured to generate the chopped voltage $V_{CH}$ independent of the magnitude of the input voltage $V_{IN}$ and in response to a PWM signal received at the PWM signal input node 202. The pre-regulator circuit 104 further includes the chopping circuit 204, the feedback and sense circuit 206, and the pre-driver switching circuit 208.

The chopping circuit 204 includes a three-terminal bi-polar semiconductor switching transistor 318, a switchover resistor 302, a bypass resistor 304, and the bucking circuit 222. The bi-polar switching transistor 318 includes a collector, an emitter, and a base. In an embodiment, the bi-polar switching transistor 318 is a PNP type MPSA56 Amplifier transistor having a collector-to-emitter withstand voltage of at least 60 Volts. The emitter of the bi-polar switching transistor 318 is coupled with the voltage input node 108 and the base of the bi-polar switching transistor 318 is coupled with the pre-driver circuit 208. In an embodiment, the base of the bi-polar switching transistor 318 is coupled with the pre-driver circuit 208 via the current limiting resistor 216. The collector of the bi-polar switching transistor 318 is coupled with the bucking circuit 222. The bypass resistor 304 is coupled between the emitter of the bi-polar switching transistor 318 and the bucking circuit 222. The bypass resistor 304 is configured to provide for a sleep mode when the bi-polar switching transistor 318 is turned off. In an embodiment, the bypass resistor 304 has a high impedance. It is preferred that the bypass resistor has an impedance of substantially 33 kOhms. When the bi-polar switching transistor 318 is turned off, the bypass resistor 304 propagates the input voltage $V_{IN}$ to the bucking circuit 222 and thereby to the chopped voltage node 110, and minimizes current flow from the input voltage node 108 to the chopped voltage node 110. The bi-polar switching transistor 318 is configured to propagate the input voltage $V_{IN}$ to the bucking circuit in response to a switching signal received from the pre-driver circuit 208.

The feedback and sense circuit 206 includes a bi-polar feedback transistor 332, the bias network 234, and the sense diode 252. The bi-polar feedback transistor 332 includes a collector, an emitter, and a base. In an embodiment, the bi-polar feedback transistor 332 is an NPN type MPSA06 or similar transistor. The collector of the bi-polar feedback transistor 332 defines the output of the feedback and sense circuit 206 and is coupled with the feedback node 214 and the emitter of the bi-polar feedback transistor 332 is coupled with the ground reference. In an embodiment, the sense diode 252 has a breakdown voltage of 6.0 Volts and bias network includes a first bias resistor and second a second bias resistor each having a resistance value of 30 kiloOhms.

The pre-driver circuit includes a bi-polar pre-driver transistor 340 and the PWM.interface network 242. The pre-driver transistor 340 includes a emitter, a collector, and a base. In an embodiment, the bi-polar pre-driver transistor 340 is an NPN type MPSA06 or similar transistor. The base of the pre-driver transistor 240 is coupled with the feedback node 214, the emitter of the pre-driver transistor 240 is coupled with the ground reference and the collector of the pre-driver transistor 240 is coupled with the base of the switching transistor 218. The pre-driver circuit is configured to propagate the PWM signal to the switching transistor 218 in response to the feedback signal at the feedback node 214. The PWM interface circuit 242 receives the PWM signal at the PWM interface node 212. When the PWM signal is propagated by the pre-driver circuit 208 to the switching transistor 218, the switching transistor propagates the input voltage $V_{IN}$ and current flow to the bucking coil 248 to charge the charge well 230 and to the chopped voltage node 110.

The voltage embodiments described herein provide a low-frequency, low-power voltage pre-regulator circuit operable to provide a chopped voltage to a linear regulator circuit. The pre-regulator circuit may be controlled to switch to a sleep mode, whereby the input voltage may be propagated to the output of the pre-regulator circuit, while minimizing current flow through the pre-regulator circuit. By way of example, it may be desirable to switch the voltage pre-regulator to the sleep mode when current requirements at the output of the pre-regulator are minimal. Because the current flow through the pre-regulator circuit can be reduced, the power dissipated by the pre-regulator circuit can also be reduced.

Various embodiments of a low-frequency, low-power voltage pre-regulator have been described and illustrated. However, the description and illustrations are by way of example only. Many more embodiments and implementations are possible within the scope of this invention and will be apparent to those of ordinary skill in the art. For example, characteristics for the electrical and electronic elements described herein may be varied to implement a voltage regulator within the scope of this invention. In addition, various electrical and electronic components may be combined to implement a voltage pre-regulator within the scope of this invention. The voltage regulator may be used with any other device that requires low-power voltage regulation. Therefore, the invention is not limited to the specific details, representative embodiments, and illustrated examples in this description. Accordingly, the invention is not to be restricted except in light as necessitated by the accompanying claims and their equivalents.

What is claimed is:

1. A low-frequency switching voltage pre-regulator circuit, comprising:
   an input node operative to receive an input voltage signal $V_{IN}$ having a magnitude substantially in the range from and including about 20 Volts to and including about 58 Volts;
   a pulse width modulated ("PWM") signal input node operative to receive a PWM signal having a duty cycle between approximately 25 percent and 50 percent and having a frequency substantially in the range from and including about 5 kiloHertz to and including about 15 kiloHertz; and
   a chopped voltage node operative to provide a chopped voltage $V_{CH}$ having a substantially constant magnitude independent of the magnitude of the input voltage signal $V_{IN}$ and substantially in the range from and including about 6 Volts to and including about 10 Volts, wherein the pre-regulator circuit is operative to selectively generate the chopped voltage $V_{CH}$ at the chopped voltage node in response to the PWM signal and the input voltage signal, and selectively operate in a sleep mode, whereby current through the pre-regulator circuit is restricted.

2. The low-frequency switching voltage pre-regulator circuit of claim 1 further comprising:
   a chopping circuit coupled with the input node and being operative to receive the input voltage $V_{IN}$ and generate a bucking signal at a buck node in response to a switching signal received via a current limiting resistor at a switching signal node;
   a bucking circuit coupled with the chopping circuit at the buck node and being operative to generate the chopped voltage $V_{CH}$ at the chopped voltage node in response to the bucking signal;
   a feedback and sense circuit coupled with the chopped voltage node and being operative sense the magnitude of the chopped voltage $V_{CH}$ and to provide a feedback signal at a feedback node in response to the magnitude of the chopped voltage $V_{CH}$; and
   a pre-driver switching circuit coupled with the PWM input node and with the feedback node, the pre-driver circuit being operative to selectively generate the switching signal in response to the feedback signal and PWM signal.

3. The low-frequency switching voltage pre-regulator circuit of claim 2 wherein the chopping circuit comprises a low voltage, high speed three-terminal semiconductor switching device operative to propagate the input voltage $V_{IN}$ to the buck node in response to the switching signal, and operative switch to a sleep mode.

4. The low-frequency switching voltage pre-regulator circuit of claim 3 wherein the a bucking circuit comprises:
   a bucking coil coupled with the buck node and being operative to store electrical energy in response to the buck signal and to provide a bucking current at the chopped voltage node in response to the bucking signal; and
   a charge well coupled with the chopped voltage node and being operative to provide the chopped voltage $V_{CH}$ in response to the bucking current.

5. The low-frequency switching voltage pre-regulator circuit of claim 4 wherein the feedback and sense circuit comprises:
   a sense diode coupled with the chopped voltage node and being operative to conduct current in response to the magnitude of the chopped voltage $V_{CH}$;

a resistor bias network coupled sense diode and being operative to provide a bias signal at a bias node; and a low voltage, high speed three-terminal semiconductor switching device coupled with the bias node and being operative to generate the feedback signal in response to the bias signal.

6. The low-frequency switching voltage pre-regulator circuit of claim 5 wherein the pre-driver switching circuit comprises:

a resistor bias network coupled with the PWM input node and the feedback node and being operative to propagate the PWM signal in response to the feedback signal; and a low voltage, high speed three-terminal semiconductor switching device coupled with the resistor bias network and the feedback node and being operative to generate the switching signal in response to the feedback signal and the PWM signal.

7. The low-frequency switching voltage pre-regulator circuit of claim 6 wherein switching device comprises an enhancement mode P-Channel MOSFET transistor having a drain-to-source withstand of at least 60 Volts.

8. The low-frequency switching voltage pre-regulator circuit of claim 6 wherein the switching device comprises a PNP bipolar transistor having a collector-emitter withstand of at least 60 Volts and having a two-terminal switchover bypass resistor having a first terminal coupled with a collector of the transistor and a second terminal coupled with an emitter of the transistor.

9. A voltage regulator circuit, comprising:

a switching pre-regulator circuit being operative to selectively generate a chopped voltage $V_{CH}$ at a chopped voltage node in response to a low-frequency pulse width modulated ("PWM") signal received at a PWM input node and an input voltage $V_{IN}$ received at a voltage input node, where the input voltage $V_{IN}$ is substantially in the range from about 20 Volts to about 58 Volts, and the chopped voltage $V_{CH}$ has a substantially constant magnitude independent of the magnitude of the input voltage $V_{IN}$ and substantially in the range from about 6 Volts to about 10 Volts; and a linear voltage regulator circuit coupled with the chopped voltage node and being operative to generate a substantially regulated voltage at a voltage regulator output node in response to the chopped voltage $V_{CH}$.

10. The voltage regulator circuit according to claim 9, wherein the switching pre-regulator circuit comprises:

a feedback and sense circuit coupled with the chopped voltage node and being operative to generate a feedback signal at a feedback node in response to the chopped voltage $V_{CH}$;

a pre-driver switching circuit coupled with the feedback node and the PWM input node and being operative to generate a switching signal at a switching node in response to the PWM signal and the feedback signal; and a chopping circuit having an input operative to receive the input voltage $V_{IN}$ and an output defining the pre-regulator output, the chopping circuit being coupled with the switching node and being operative to generate the chopped voltage $V_{CH}$ at the pre-regulator output node in response to the input voltage and being operative to restrict current to the output node in response to the switching signal.

11. The voltage regulator circuit according to claim 10, wherein the PWM signal comprises a modulated voltage signal having a duty cycle between approximately 25 percent and 50 percent, and a frequency between approximately 5 kiloHertz and 15 kiloHertz, the input voltage $V_{IN}$ having a magnitude substantially in the range from and including about 20 Volts to and including about 58 Volts, and the chopped voltage $V_{CH}$ having a magnitude substantially in the range from and including about 6 Volts to and including about 10 Volts.

12. The voltage regulator circuit according to claim 11, wherein the feedback and sense circuit comprises:

a sense diode coupled with the chopped voltage node and being operative to conduct current in response to the magnitude of the chopped voltage $V_{CH}$;

a resistor bias network coupled sense diode and being operative to provide a bias signal at a bias node; and a low voltage, high speed three-terminal semiconductor switching device coupled with the bias node and being operative to generate the feedback signal in response to the bias signal.

13. The voltage regulator circuit according to claim 11, wherein the pre-driver switching circuit comprises:

a sense diode coupled with the chopped voltage node and being operative to conduct current in response to the magnitude of the chopped voltage $V_{CH}$;

a resistor bias network coupled sense diode and being operative to provide a bias signal at a bias node; and a low voltage, high speed three-terminal semiconductor switching device coupled with the bias node and being operative to generate the feedback signal in response to the bias signal.

14. The voltage regulator circuit according to claim 13, wherein the chopping circuit comprises:

a power switch transistor operative to propagate the input voltage $V_{IN}$ in response to the switching signal;

a bucking coil coupled with the power switch transistor and being operative to generate a bucking current at the chopped voltage node in response to the propagated input voltage $V_{IN}$;

a charge well coupled with the chopped voltage node and being operative to generate the chopping voltage at the chopped voltage node in response to the bucking current.

15. A cascade voltage regulator comprising:

a switching voltage pre-regulator means operative to receive an input voltage $V_{IN}$ a low-frequency pulse width modulated ("PWM") signal and for generating a chopped voltage $V_{CH}$ at a chopped voltage node in response to a the PWM signal, where the input voltage $V_{IN}$ is substantially in the range from about 20 Volts to about 58 Volts and the chopped voltage $V_{CH}$ has a substantially constant magnitude independent of the magnitude of the input voltage $V_{IN}$ and substantially in the range from about 6 Volts to about 10 Volts; and a linear voltage regulating means coupled with the switching voltage pre-regulator means for receiving the chopped voltage output and for generating a regulated voltage output at a voltage regulator output node in response to the chopped voltage $V_{CH}$.

16. The voltage regulator according to claim 15, wherein the switching pre-regulator comprises:

a feedback means for generating a feedback signal responsive to the chopped voltage output;

a pre-driver switching means for receiving the feedback signal and the PWM signal and for generating a switching signal in response to the PWM signal and the feedback signal; and a voltage chopping means for receiving the input voltage $V_{IN}$ and the switching signal and for generating the chopped voltage in response to the switching signal.

17. The voltage regulator according to claim 16 wherein the PWM signal comprises a control signal generated by a microprocessor and having a frequency between about 5 kiloHertz and 15 kiloHertz and having about a 33 percent duty cycle, the input voltage $V_{IN}$ comprises DC voltage having a magnitude substantially in the range from and including about 10 Volts to about and including 58 Volts, and the chopped voltage $V_{CH}$ is approximately 7.6 Volts.

18. A method for controlling a voltage output in response to a input voltage, comprising:

selectively generating a chopped voltage signal in response to a pulse width modulated ("PWM") signal received from microprocessor and an input voltage having a magnitude substantially within a range from and including about 20 Volts to and including about 58 Volts, the chopped voltage having a magnitude independent of the input voltage and being substantially within the range from and including about 6 Volts to and including about 10 Volts, the magnitude of the chopped voltage being independent of the magnitude of the input voltage.

19. The method of claim 18 further comprising the step of generating the PWM from a microprocessor circuit, the PWM signal having a frequency between about 5 kiloHertz and 15 kiloHertz and having about a 33 percent duty cycle.

20. The method of claim 19 further comprising generating a regulated voltage in response to the chopped voltage signal.

* * * * *